United States Patent
Yamamoto et al.

(10) Patent No.: US 12,117,807 B2
(45) Date of Patent: Oct. 15, 2024

(54) SUPPORT DEVICE, RECORDING MEDIUM STORING SETTING PROGRAM AND METHOD

(71) Applicant: OMRON CORPORATION, Kyoto (JP)

(72) Inventors: Taisei Yamamoto, Tokyo (JP); Toru Kogawara, Kyoto (JP); Naoki Hirobe, Kyoto (JP); Yuta Nagata, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 316 days.

(21) Appl. No.: 17/608,290

(22) PCT Filed: Mar. 5, 2020

(86) PCT No.: PCT/JP2020/009295
§ 371 (c)(1),
(2) Date: Nov. 2, 2021

(87) PCT Pub. No.: WO2020/240969
PCT Pub. Date: Dec. 3, 2020

(65) Prior Publication Data
US 2022/0206465 A1 Jun. 30, 2022

(30) Foreign Application Priority Data
May 28, 2019 (JP) .................................. 2019-099598

(51) Int. Cl.
*G05B 19/418* (2006.01)
(52) U.S. Cl.
CPC .. *G05B 19/418* (2013.01); *G05B 2219/31001* (2013.01)

(58) Field of Classification Search
CPC ........ G05B 19/418; G05B 2219/31001; G05B 19/042; G05B 23/0286; G05B 19/058; G05B 2219/31; Y02P 90/02
See application file for complete search history.

(56) References Cited

U.S. PATENT DOCUMENTS

| | | |
|---|---|---|
| 2003/0023340 A1 | 1/2003 | Kitamoto et al. |
| 2011/0039237 A1 | 2/2011 | Skare |

(Continued)

FOREIGN PATENT DOCUMENTS

| | | |
|---|---|---|
| CN | 108227603 A | 6/2018 |
| JP | 2000-137506 A | 5/2000 |

(Continued)

OTHER PUBLICATIONS

Extended European Search Report dated Dec. 22, 2022 in European Application No. 20812883.5.

(Continued)

*Primary Examiner* — Chad G Erdman
(74) *Attorney, Agent, or Firm* — Sughrue Mion, PLLC

(57) ABSTRACT

A support device is connected to a controller system that controls a control target. The controller system can execute an incident response operation of changing a behavior in accordance with an incident that may occur in the controller system. The support device includes a selection module and a setting module. The selection module receives selection of a facility type corresponding to the control target among plural facility types which is preset. The setting module reflects a response rule corresponding to the selected facility type in the controller system by referring to a response rule that is prepared in advance for each of the facility types and defines a behavior for an incident.

12 Claims, 17 Drawing Sheets

(56) References Cited

U.S. PATENT DOCUMENTS

| | | | |
|---|---|---|---|
| 2012/0210158 A1 | 8/2012 | Akiyama et al. | |
| 2013/0152198 A1 | 6/2013 | Akiyama et al. | |
| 2014/0195184 A1 | 7/2014 | Maeda et al. | |
| 2015/0295944 A1 | 10/2015 | Yunoki et al. | |
| 2017/0075336 A1 | 5/2017 | Ueda | |
| 2017/0171235 A1* | 6/2017 | Mulchandani | G06F 21/554 |
| 2018/0024537 A1* | 1/2018 | Chauvet | H04L 63/20 |
| | | | 718/104 |
| 2018/0164768 A1 | 6/2018 | Kawanoue | |

FOREIGN PATENT DOCUMENTS

| | | |
|---|---|---|
| JP | 2012-168686 A | 9/2012 |
| JP | 2013-41448 A | 2/2013 |
| JP | 2014-63337 A | 4/2014 |
| JP | 2015-176369 A | 10/2015 |
| JP | 2018-200731 A | 12/2018 |
| JP | 2019-046207 A | 3/2019 |
| WO | 2015/001594 A1 | 1/2015 |
| WO | 2015/136961 A1 | 9/2015 |

OTHER PUBLICATIONS

Written Opinion for PCT/JP2020/009295, dated Jun. 2, 2020.
International Search Report for PCT/JP2020/009295, dated Jun. 2, 2020.
Japanese Office Action dated Mar. 19, 2024 in Application No. 2023-052144.
Communication dated Oct. 31, 2023 issued by the State Intellectual Property Office of the P.R.China in application No. 202080032082.1.

* cited by examiner

FIG.8

| | PHASE A | PHASE B | PHASE C |
|---|---|---|---|
| INCIDENT 1 | RESPONSE 1 | RESPONSE 4 | RESPONSE 4 |
| INCIDENT 2 | RESPONSE 1 | RESPONSE 2 | RESPONSE 2 |
| INCIDENT 3 | RESPONSE 1 | RESPONSE 1 | RESPONSE 1 |

FIG.9

| PHASE A | PHASE B | PHASE C |
|---|---|---|
| RESPONSE 1 | RESPONSE 4 | RESPONSE 4 |

FIG.10

| INCIDENT 1 | RESPONSE 1 |
|---|---|
| INCIDENT 2 | RESPONSE 2 |
| INCIDENT 3 | RESPONSE 3 |

FIG.15

| CLASS 1 | PHASE A | PHASE B | PHASE C |
|---|---|---|---|
| ATTACK 1 | ALL RESPONSES SELECTABLE | RESPONSES 2,3 UNSELECTABLE | RESPONSES 2 UNSELECTABLE |
| ATTACK 2 | ALL RESPONSES SELECTABLE | RESPONSES 1,2,3 UNSELECTABLE | RESPONSES 3 UNSELECTABLE |
| ATTACK 3 | ALL RESPONSES SELECTABLE | RESPONSES 2,3 UNSELECTABLE | RESPONSES 2 UNSELECTABLE |

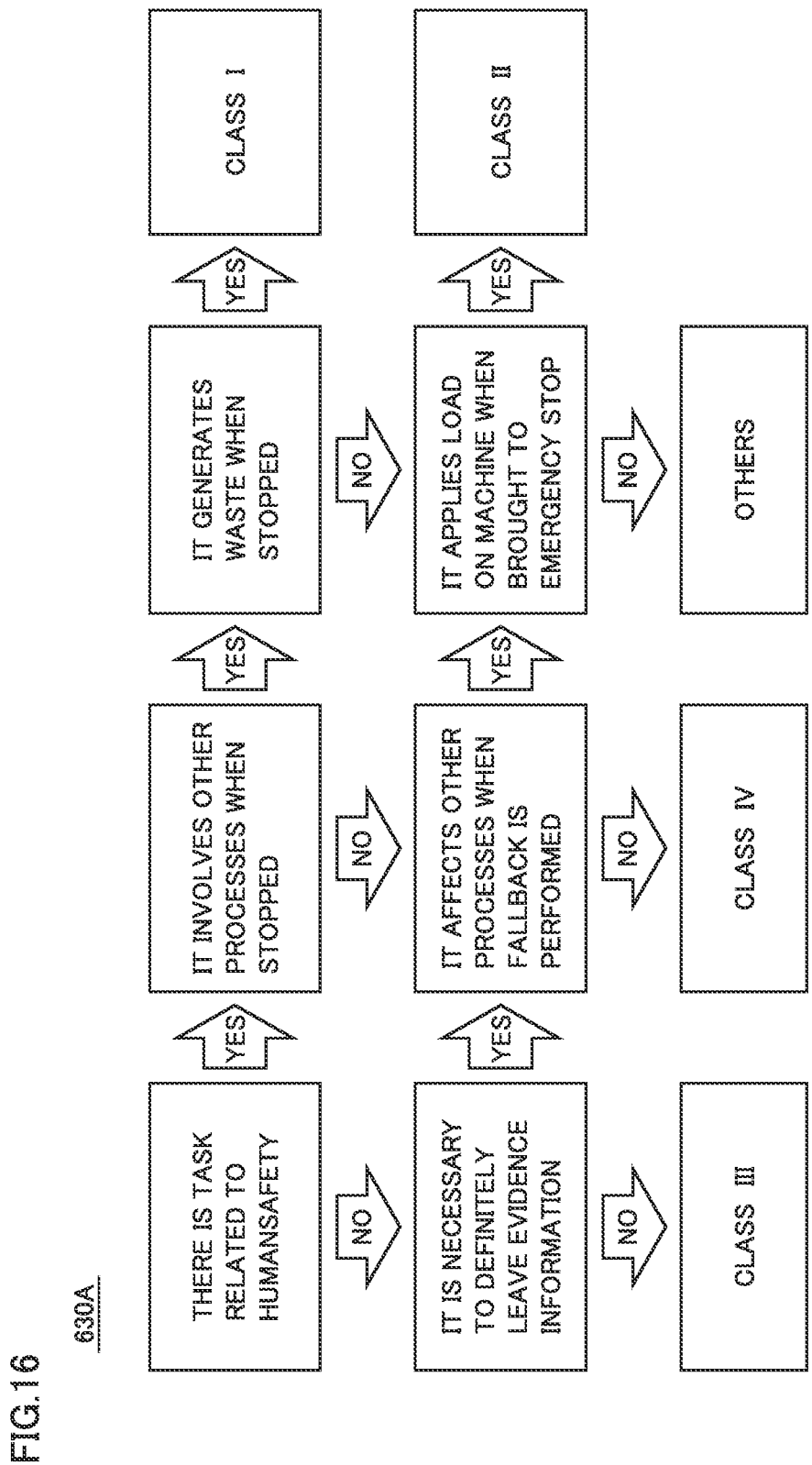

| FIRST QUESTION | THERE IS TASK RELATED TO HUMAN SAFETY | YES | NO |
|---|---|---|---|
| SECOND QUESTION | IT INVOLVES OTHER PROCESSES WHEN STOPPED | YES | NO |
| THIRD QUESTION | IT GENERATES WASTE WHEN STOPPED | YES | NO |
| FOURTH QUESTION | IT IS NECESSARY TO DEFINITELY LEAVE EVIDENCE INFORMATION | YES | NO |
| FIFTH QUESTION | IT AFFECTS OTHER PROCESSES WHEN FALLBACK IS PERFORMED | YES | NO |
| SIXTH QUESTION | IT APPLIES LOAD ON MACHINE WHEN BROUGHT TO EMERGENCY STOP | YES | NO |

FIG.18

| | 636B | | | | | |
|---|---|---|---|---|---|---|
| 1 | 2 | 3 | 4 | 5 | 6 | CLASS |
| YES | NO | NO | NO | NO | NO | I |
| YES | YES | NO | NO | NO | NO | II |
| YES | YES | YES | NO | NO | NO | III |
| YES | YES | YES | YES | NO | NO | |
| YES | YES | YES | YES | YES | NO | |
| YES | NO | YES | NO | NO | NO | IV |
| ... | ... | ... | ... | ... | ... | ... |

SUPPORT DEVICE, RECORDING MEDIUM STORING SETTING PROGRAM AND METHOD

CROSS REFERENCE TO RELATED APPLICATIONS

This application is a National Stage of International Application No. PCT/JP2020/009295 filed Mar. 5, 2020, claiming priority based on Japanese Patent Application No. 2019-099598 filed May 28, 2019, the entire contents of each of which being herein incorporated by reference in their entireties.

TECHNICAL FIELD

The present invention relates to a support device connected to a controller system for controlling a control target and a setting program for setting a behavior of the controller system for controlling the control target.

BACKGROUND ART

In production sites such as factories, various types of facilities operate, and control devices such as programmable logic controllers (PLCs) are used to control various facilities and various devices installed in each facility.

In recent years, damage such as malware has occurred in production sites such as factories, and security measures are needed for control devices such as PLCs. Therefore, when a device or a production line used in a factory or the like is developed, it is necessary for a production engineer, a developer in a device manufacturer, or the like to take security measures.

As disclosed in, for example, Japanese Patent Laying-Open No. 2000-137506 (PTL 1), a PLC transmits an electronic mail to an address which is designated in advance when an abnormality history is registered or when a predetermined time has come, and does not consider any security measures.

CITATION LIST

Patent Literature

PTL 1: Japanese Patent Laying-Open No. 2000-137506

SUMMARY OF INVENTION

Technical Problem

With the recent progress of information and communication technology (ICT), a control device is also connected to various external devices via a network, and processing executed in the control device is also advanced. In conjunction with such networked or intelligent devices, types of possible incidents are also increasing.

A security function is set for such incidents, and after a certain incident occurs, an operation (incident response operation) of the control device according to the incident is set.

In a production site such as a factory, various facilities operate. In a case where a common incident response operation is uniformly set for the control device regardless of the facility type, there is a possibility that safety cannot be ensured or a significant economic damage occurs depending on the facility type. Therefore, it is preferable to set the incident response operation to the control device according to the facility type. However, setting according to the facility type imposes a heavy burden on a developer.

An object of the present invention is to enable easy setting according to a facility type for an incident that may occur in conjunction with networked or intelligent control devices and control systems.

Solution to Problem

A support device according to one aspect of the present disclosure is connected to a controller system for controlling a control target. The controller system is configured to be capable of executing an incident response operation of changing a behavior in accordance with an incident that may occur in the controller system. The support device includes: a selection module configured to receive selection of a facility type corresponding to the control target among a plurality of preset facility types; and a setting module configured to reflect a response rule corresponding to the selected facility type in the controller system by referring to a response rule that is prepared in advance for each of the facility types and that defines a behavior for an incident.

According to this configuration, it is possible to enable easy setting for an incident according to a facility type.

In the above disclosure, the facility types are classified according to a control purpose of the control target. With this configuration, a user can easily select the facility type.

In the above disclosure, the facility types are classified according to a demand for the control target. With this configuration, it is possible to easily set a response to the incident according to the demand for the control target.

In the above disclosure, the selection module receives an input of a control purpose of the control target, and stores the received control purpose and the selected facility type in association with each other. With this configuration, it is possible to associate the facility type classified according to the demand for the control target with the control purpose of the control target, so that it is also possible to select the facility type according to the control purpose and to select the facility type according to the demand for the control target.

In the above disclosure, the setting module receives a change in the response rule. The response rule has a default value that is preset for each facility type. This configuration enables flexible setting, and enables easy setting even by a user (developer) with insufficient knowledge, because the default value is preset.

In the above disclosure, the range in which the response rule is changeable is preset for each facility type. According to this disclosure, it is possible to set a minimum necessary response, resulting in that it is possible to ensure minimum protection.

A recording medium according to an aspect of the present disclosure stores a setting program that sets a behavior of a controller system for controlling a control target. The controller system is configured to be capable of executing an incident response operation of changing a behavior in accordance with an incident that may occur in the controller system. The setting program causes a computer to execute: receiving selection of a facility type corresponding to the control target among a plurality of facility types which is preset; and reflecting a response rule corresponding to the selected facility type in the controller system by referring to a response rule that is prepared in advance for each of the facility types and that defines a behavior for each incident.

According to this configuration, it is possible to enable easy setting for an incident according to a facility type.

Advantageous Effects of Invention

According to the present invention, it is possible to enable easy setting for an incident according to a facility type.

BRIEF DESCRIPTION OF DRAWINGS

FIG. 8 is a diagram illustrating a correspondence table 66 defining behavior for each incident.

FIG. 9 is a diagram illustrating a modification of the correspondence table.

FIG. 10 is a diagram illustrating a modification of the correspondence table.

FIG. 15 is a diagram illustrating a correspondence table for each facility type in a modification.

FIG. 16 is a facility type selection screen 630A according to a first modification.

FIG. 17 is a facility type selection screen 630B according to a second modification.

FIG. 18 is a diagram illustrating an example of a facility type determination table 636B for determining a facility type in accordance with information input using facility type selection screen 630B illustrated in FIG. 17.

DESCRIPTION OF EMBODIMENTS

Figure 1:
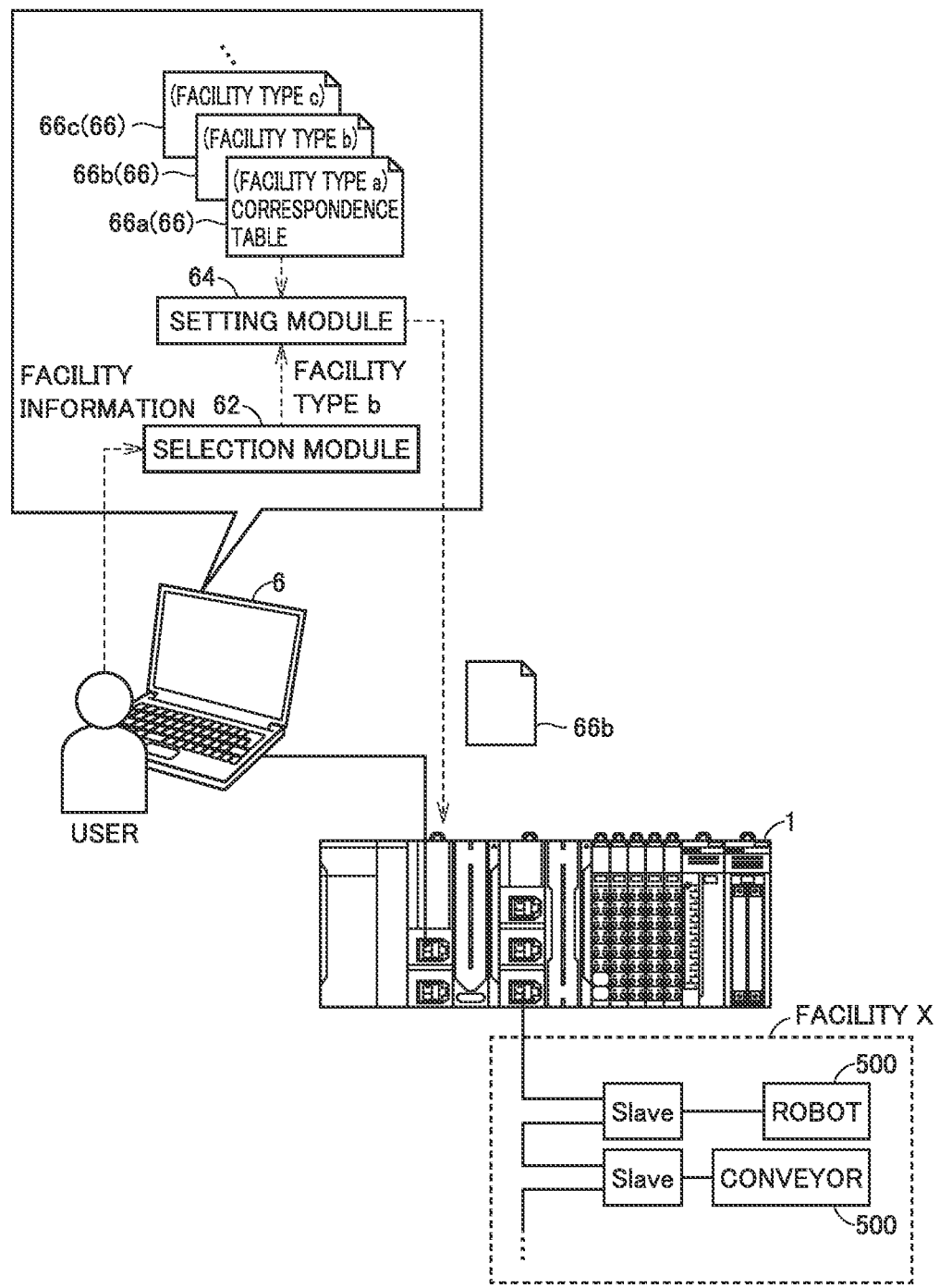
FIG. 1 is a schematic diagram for describing functions provided by a support device 6 according to a present embodiment.

Embodiments of the present invention will be described in detail with reference to the drawings. The same or corresponding parts in the drawings are denoted by the same reference signs, and the description thereof will not be repeated.

A. Application Examples

An example of a scene to which the present invention is applied will be described. First, a configuration of controller system 1 according to the embodiment will be described.

FIG. 1 is a schematic diagram for describing functions provided by support device 6 according to the present embodiment. Support device 6 is connected to controller system 1 for controlling a control target.

Controller system 1 executes control computation for controlling the control target in accordance with required specifications freely designed depending on the control target. Each facility or each device included in the facility may be set as the control target controlled by controller system 1. Note that each control target included in the facility is also referred to as a field device 500.

Controller system 1 can control various types of facilities according to purposes, such as controlling facilities used for an assembly process and controlling facilities used for a process of filling an object, by designing required specifications.

Controller system 1 is configured to be capable of executing an incident response operation of changing a behavior in accordance with an incident that may occur in controller system 1. In the present specification, the "incident" means a sign, a phenomenon, or an abnormality that can be a security threat to controller system 1. In addition, the "incident" is not limited to an incident that occurs directly on controller system 1, and includes an incident that occurs indirectly via various devices communicably connected to controller system 1.

For example, in a case where an incident occurs during normal operation of a facility, controller system 1 can reduce an influence caused by the incident by stopping the operation or performing fallback (for example, gradually reducing a conveyance speed).

Support device 6 provides a setting support function for setting the incident response operation. Referring to FIG. 1, support device 6 includes a selection module 62 and a setting module 64.

Typically, the functions of selection module 62 and setting module 64 are implemented by a processor of support device 6 executing a support program for supporting the setting of the incident response operation.

Selection module 62 receives selection of a facility type corresponding to a target to be controlled by controller system 1 from among a plurality of preset facility types. For example, the facility types may be classified according to a demand for the control target, such as a viewpoint of safety required for the control target, a viewpoint of importance of the control target in the factory, and a viewpoint of economic damage caused by stopping the operation of the control target, or may be classified according to a purpose of controlling the control target.

Typically, selection module 62 provides a user interface that receives an input of facility-related information (facility information in the drawing) necessary for selecting the facility type, and selects the facility type on the basis of the facility information. In the example illustrated in FIG. 1, it is assumed that selection module 62 selects facility type b on the basis of the facility information.

By referring to correspondence table 66 that is prepared in advance for each facility type and that defines a behavior for each incident, setting module 64 selects correspondence table 66 corresponding to the facility type selected by selection module 62. In the example illustrated in FIG. 1, a correspondence table 66b is selected. Correspondence table 66 defines, for each incident, a behavior for the incident. Setting module 64 reflects the rule indicated by correspondence table 66 in controller system 1 so that the behavior for each incident defined by correspondence table 66 is performed.

In this manner, support device 6 can easily perform setting for the incident according to the facility type by selecting the facility type and referring to correspondence table 66 prepared in advance for each facility type.

For example, when a user uses support device 6 according to the present embodiment, the user can set the incident response operation according to the facility type only by selecting the facility type.

B. Hardware Configuration Example of Support Device

Figure 2:
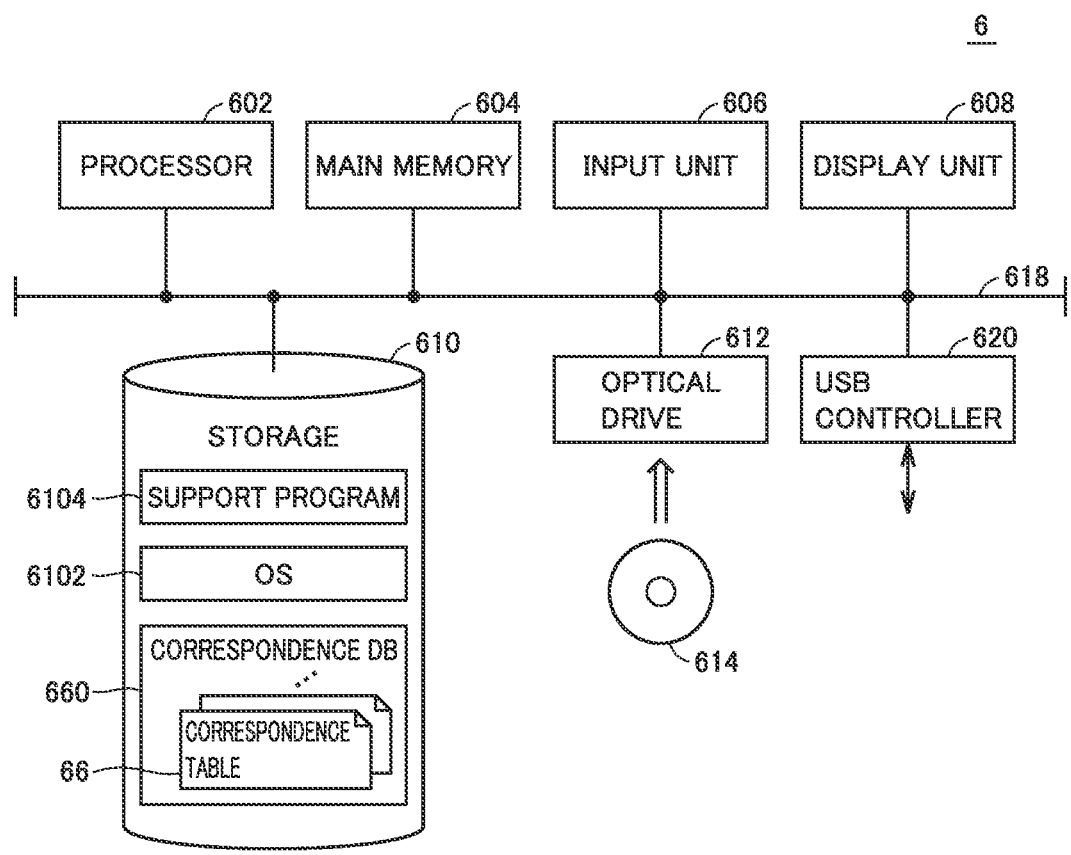
FIG. 2 is a schematic diagram illustrating a hardware configuration example of support device 6 according to the present embodiment.

FIG. 2 is a schematic diagram illustrating a hardware configuration example of support device 6 according to the embodiment. For example, support device 6 is constructed with hardware (for example, a general-purpose personal computer) in accordance with a general-purpose architecture. In the following description, a database is referred to as "DB".

Referring to FIG. 2, support device 6 includes a processor 602, a main memory 604, an input unit 606, a display unit 608, a storage 610, an optical drive 612, and a universal serial bus (USB) controller 620. These components are connected via a processor bus 618.

Processor 602 is constituted by a central processing unit (CPU), a graphical processing unit (GPU), or the like, and reads a program (for example, an operating system (OS) 6102 and a support program 6104) stored in storage 610, expands the program in main memory 604, and executes the program, thereby implementing setting processing or the like for controller system 1.

Main memory 604 includes a volatile storage device such as a dynamic random access memory (DRAM) or a static random access memory (SRAM). Storage 610 includes, for example, a non-volatile storage device such as a hard disc drive (HDD) or a solid state drive (SSD).

Storage 610 stores, in addition to OS 6102 for implementing basic functions, support program 6104 and a correspondence database 660 for providing a function as support device 6. Support program 6104 is executed by a computer connected to controller system 1, thereby implementing support device 6 according to the present embodiment.

Support program 6104 includes a program for providing a setting support function for setting the incident response operation. The functions of selection module 62 and setting module 64 illustrated in FIG. 1 are implemented by processor 602 executing support program 6104.

Correspondence database 660 stores correspondence table 66 prepared in advance for each facility type.

Input unit 606 includes a keyboard, a mouse, and the like, and receives a user operation. Display unit 608 is typically a display, and provides a user interface for inputting facility information.

USB controller 620 exchanges data with controller system 1 or the like via USB connection.

Support device 6 includes optical drive 612. From a non-transitory computer-readable recording medium 614 storing a program (for example, an optical recording medium such as a digital versatile disc (DVD)), the program stored therein is read and installed in storage 610 or the like.

Support program 6104 and the like executed by support device 6 may be installed via computer-readable recording medium 614, or may be installed by being downloaded from a server device or the like on a network. Further, the functions provided by support device 6 according to the present embodiment may be achieved by using a part of modules provided by the OS.

FIG. 2 illustrates the configuration example in which processor 602 executes the program to provide the necessary functions as support device 6. Alternatively, some or all of the provided functions may be implemented using a dedicated hardware circuit (for example, an application specific integrated circuit (ASIC), a field-programmable gate array (FPGA), or the like).

C. Controller System 1

Figure 3:
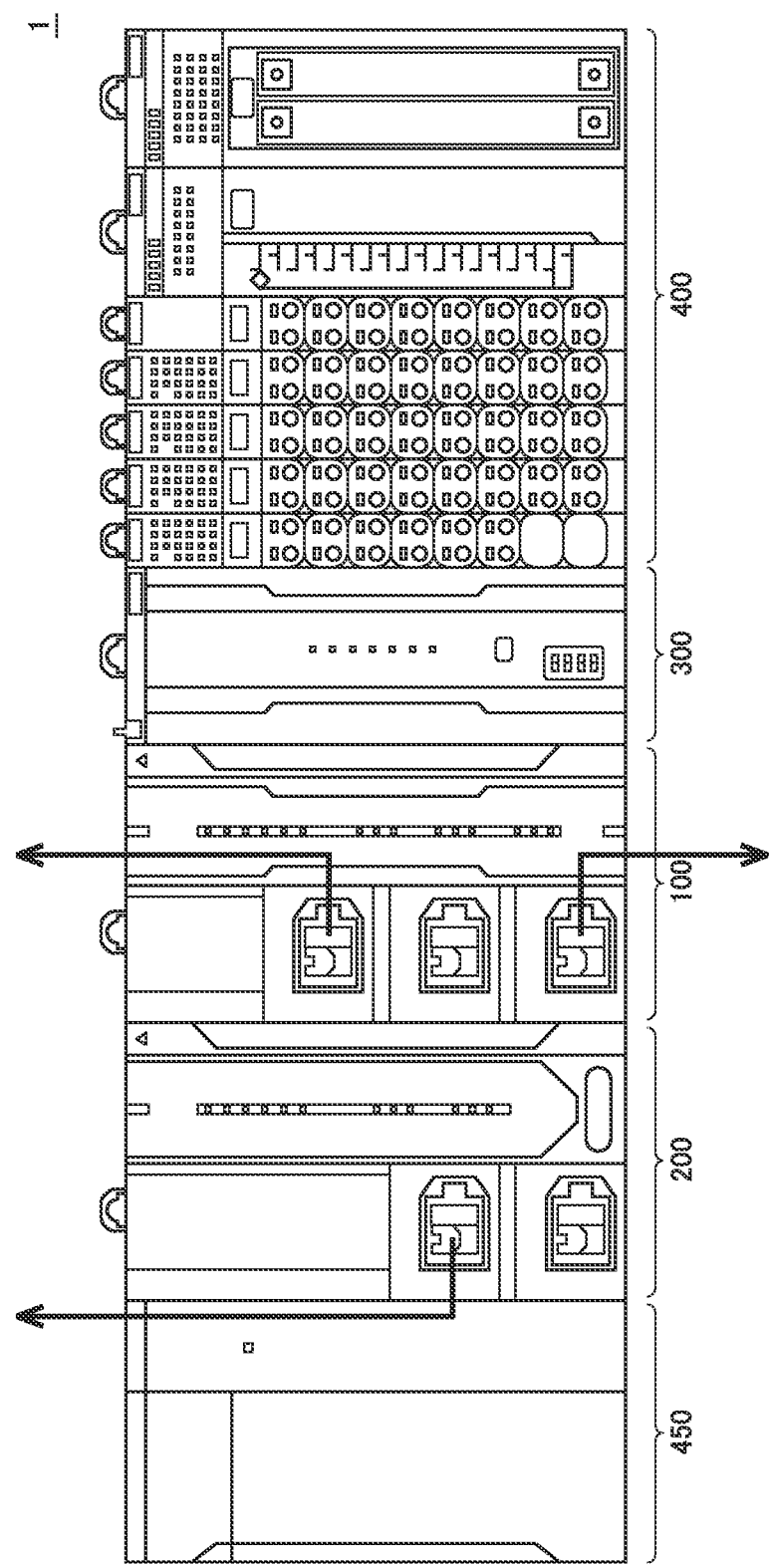
FIG. 3 is an external view illustrating a configuration example of a controller system 1 according to the present embodiment.

The configuration of controller system 1 according to the present embodiment will be described. FIG. 3 is an external view illustrating a configuration example of controller system 1 according to the embodiment. Referring to FIG. 3, controller system 1 includes a control unit 100, a security unit 200, a safety unit 300, one or more functional units 400, and a power supply unit 450.

Control unit 100 and security unit 200 are connected to each other through any data transmission path (for example, PCI Express, Ethernet (registered trademark), or the like). Control unit 100 is connected to safety unit 300 and one or more functional units 400 via an internal bus (not illustrated).

Control unit 100 executes a key process in controller system 1. Control unit 100 executes control computation for controlling the control target according to required specifications freely designed. The control computation performed by control unit 100 is also referred to as "standard control" in comparison with the control computation performed by safety unit 300 which will be described later. In the configuration example illustrated in FIG. 3, control unit 100 has one or more communication ports.

Security unit 200 is connected to control unit 100 and has a security function for controller system 1. In the configuration example illustrated in FIG. 1, security unit 200 includes one or more communication ports. Security unit 200 detects an incident and executes processing according to the detected incident, thereby achieving execution of the incident response operation.

Safety unit 300 executes control computation for implementing a safety function related to the control target independently of control unit 100. The control computation executed by safety unit 300 is also referred to as "safety control". Usually, the "safety control" is designed to satisfy a requirement for implementing the safety function prescribed in IEC 61508 or the like. The "safety control" collectively refers to processing for preventing a threat to human safety by facility, machine, or the like.

Functional unit 400 provides various functions for implementing control on various control targets by controller system 1. Functional unit 400 may typically include an I/O unit, a safety I/O unit, a communication unit, a motion controller unit, a temperature adjustment unit, a pulse counter unit, and the like. Examples of the I/O unit include a digital input (DI) unit, a digital output (DO) unit, an analog input (AI) unit, an analog output (AO) unit, a pulse catch input unit, and a composite unit obtained by combining a plurality of types. The safety I/O unit is in charge of I/O processing related to the safety control.

Power supply unit 450 supplies power of a predetermined voltage to each unit constituting controller system 1.

D. Hardware Configuration Example of Each Unit

A hardware configuration example of each unit constituting controller system 1 according to the present embodiment will be described.

(d1: Control Unit 100)

Figure 4:
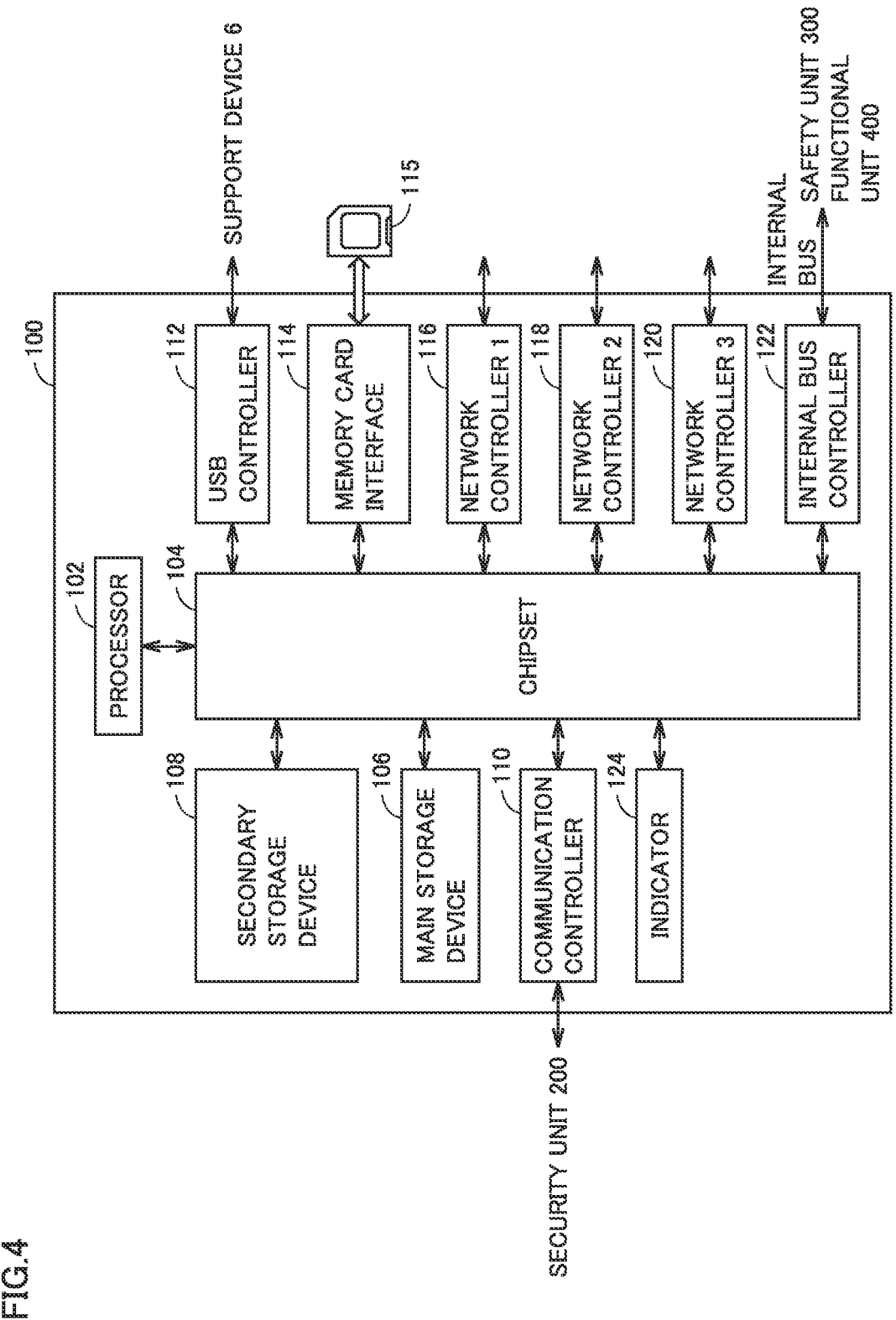
FIG. 4 is a schematic diagram illustrating a hardware configuration example of a control unit 100 constituting controller system 1 according to the present embodiment.

FIG. 4 is a schematic diagram illustrating a hardware configuration example of control unit 100 constituting controller system 1 according to the present embodiment. Referring to FIG. 4, control unit 100 includes, as main components, a processor 102 such as a CPU or a GPU, a chipset 104, a main storage device 106, a secondary storage device 108, a communication controller 110, a USB controller 112, a memory card interface 114, network controllers 116, 118, and 120, an internal bus controller 122, and an indicator 124.

Processor 102 reads various programs stored in secondary storage device 108 or memory card 115, expands the programs in main storage device 106, and executes the programs, thereby implementing control computation according to the standard control and various kinds of processing as described later. Main storage device 106 includes a volatile storage device such as a DRAM or a SRAM. Secondary storage device 108 includes, for example, a non-volatile storage device such as an HDD or an SSD.

Chipset 104 mediates the exchange of data between processor 102 and each component, thereby implementing the processing of entire control unit 100.

Secondary storage device 108 stores, in addition to a system program, a control program that operates in an operating environment provided by the system program.

Communication controller 110 is in charge of data exchange with security unit 200. As communication controller 110, a communication chip compatible with PCI Express, Ethernet (registered trademark), or the like can be adopted, for example.

USB controller 112 is in charge of data exchange with any information processing device via USB connection. For example, USB controller 112 is in charge of data exchange with support device 6.

Memory card interface 114 is configured such that memory card 115, which is an example of a storage medium, can be inserted therein and removed therefrom. Memory card interface 114 can write data such as the control program and various settings to memory card 115 or read data such as the control program and various settings from memory card 115.

Each of network controllers 116, 118, and 120 is in charge of data exchange with any device via the network. An industrial network protocol such as EtherCAT (registered trademark), EtherNet/IP (registered trademark), DeviceNet (registered trademark), or CompoNet (registered trademark) may be used for network controllers 116, 118, and 120.

Internal bus controller 122 is in charge of data exchange with safety unit 300 and one or more functional units 400 constituting controller system 1. For the internal bus, a communication protocol unique to a manufacturer may be used, or a communication protocol that is the same as or compliant with any of the industrial network protocols may be used.

Indicator 124 indicates an operation state, etc. of control unit 100, and includes one or a plurality of LEDs and the like arranged on a unit surface.

Although FIG. 4 illustrates the configuration example in which necessary functions are provided by processor 102 executing the program, some or all of these provided functions may be implemented using a dedicated hardware circuit (for example, ASIC or FPGA). Alternatively, the main part of control unit 100 may be implemented using hardware (for example, an industrial personal computer based on a general-purpose personal computer) in accordance with a general-purpose architecture. In this case, a plurality of OSs having different uses may be executed in parallel using a virtualization technology, and necessary applications may be executed on each OS.

(d2: Security Unit 200)

Figure 5:
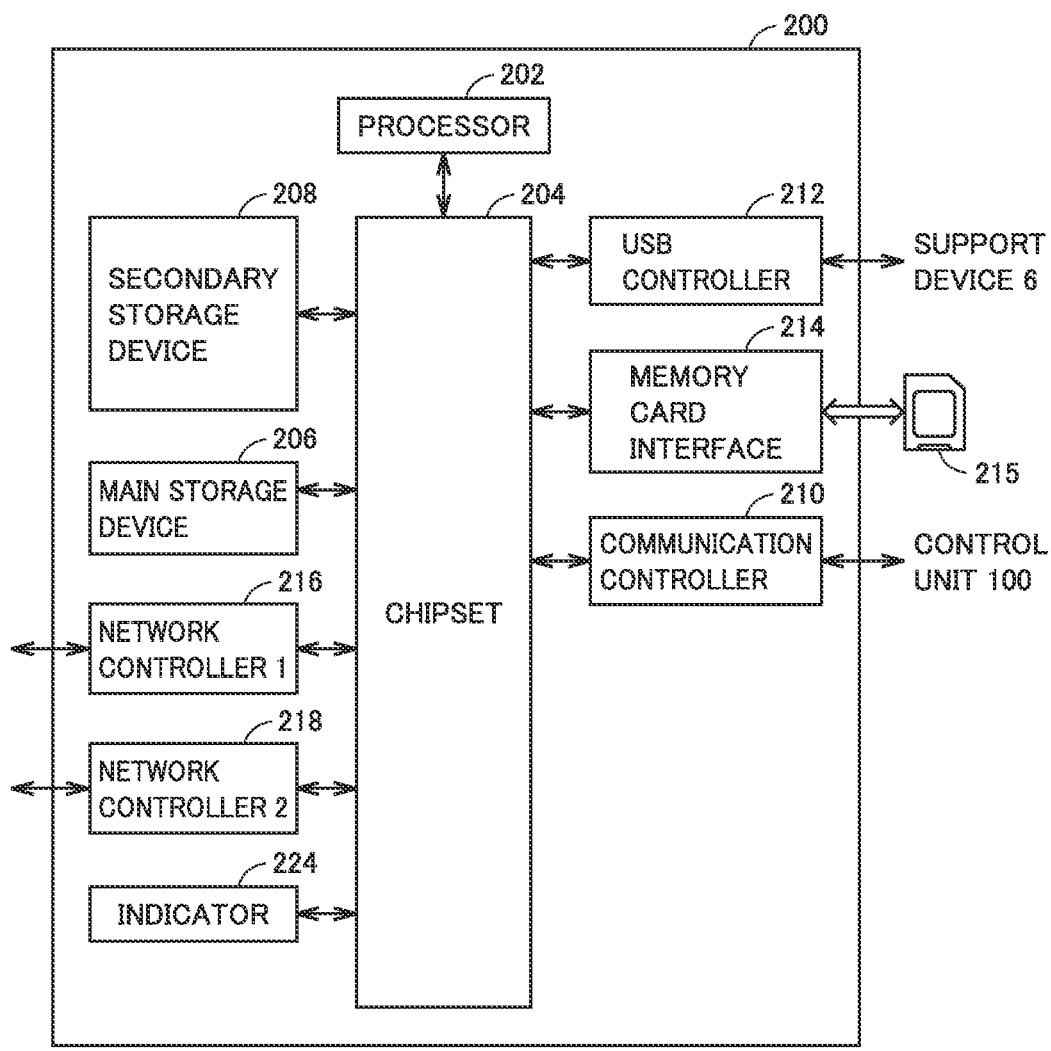
FIG. 5 is a schematic diagram illustrating a hardware configuration example of a security unit 200 constituting controller system 1 according to the embodiment.

FIG. 5 is a schematic diagram illustrating a hardware configuration example of security unit 200 constituting controller system 1 according to the present embodiment. Referring to FIG. 5, security unit 200 includes, as main components, a processor 202 such as a CPU or a GPU, a chipset 204, a main storage device 206, a secondary storage device 208, a communication controller 210, a USB controller 212, a memory card interface 214, network controllers 216 and 218, and an indicator 224.

Processor 202 reads various programs stored in secondary storage device 208 or memory card 215, expands the programs in main storage device 206, and executes the programs, thereby implementing various security functions which will be described later. Main storage device 206 includes a volatile storage device such as a DRAM or a SRAM. Secondary storage device 208 includes, for example, a non-volatile storage device such as an HDD or an SSD.

Chipset 204 mediates the exchange of data between processor 202 and each component, thereby implementing the processing of entire security unit 200.

Secondary storage device 208 stores, in addition to the system program, a security system program that operates in an operating environment provided by the system program.

Communication controller 210 is in charge of data exchange with control unit 100. As communication controller 210, a communication chip compatible with PCI Express, Ethernet (registered trademark), or the like can be adopted, for example, as in communication controller 110 of control unit 100.

USB controller 212 is in charge of data exchange with any information processing device via USB connection. For example, USB controller 212 is in charge of data exchange with support device 6.

Memory card interface 214 is configured such that memory card 215, which is an example of a storage medium, can be inserted therein and removed therefrom. Memory card interface 214 can write data such as the control program and various settings to memory card 215 or read data such as the control program and various settings from memory card 215.

Each of network controllers 216 and 218 is in charge of data exchange with any device via the network. Network controllers 216 and 218 may adopt a general-purpose network protocol such as Ethernet (registered trademark).

Indicator 224 indicates an operation state, etc. of security unit 200, and includes one or a plurality of LEDs and the like arranged on a unit surface.

Although FIG. 5 illustrates the configuration example in which necessary functions are provided by processor 202 executing the program, some or all of these provided functions may be implemented using a dedicated hardware circuit (for example, ASIC or FPGA). Alternatively, the main part of security unit 200 may be implemented using hardware (for example, an industrial personal computer based on a general-purpose personal computer) in accordance with a general-purpose architecture. In this case, a plurality of OSs having different uses may be executed in parallel using a virtualization technology, and necessary applications may be executed on each OS.

(d3: Safety Unit 300)

Figure 6:
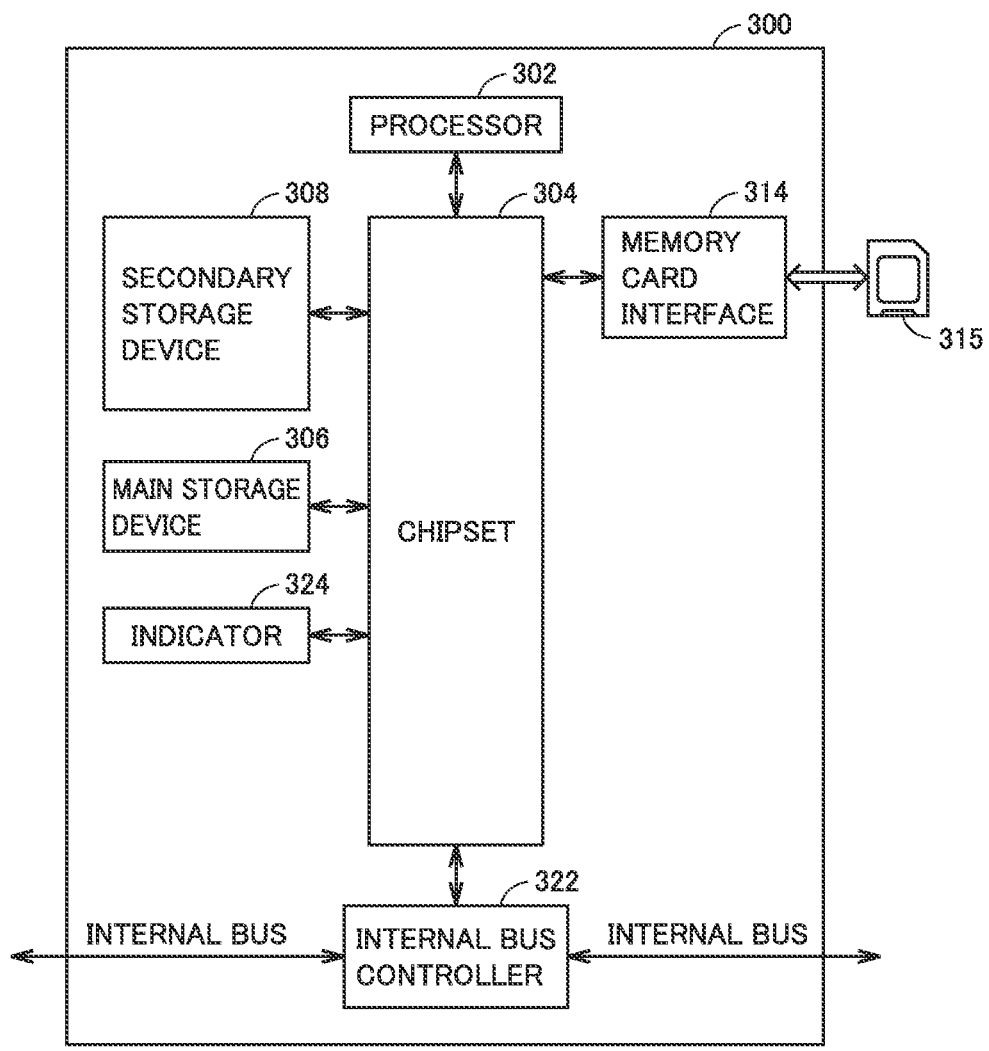
FIG. 6 is a schematic diagram illustrating a hardware configuration example of a safety unit 300 constituting controller system 1 according to the present embodiment.

FIG. 6 is a schematic diagram illustrating a hardware configuration example of a safety unit 300 constituting controller system 1 according to the present embodiment. Referring to FIG. 6, safety unit 300 includes, as main components, a processor 302 such as a CPU or a GPU, a chipset 304, a main storage device 306, a secondary storage device 308, a memory card interface 314, an internal bus controller 322, and an indicator 324.

Processor 302 reads various programs stored in secondary storage device 308, expands the programs in main storage device 306, and executes the programs, thereby implementing control computation related to safety control and various kinds of processing that will be described later. Main storage device 306 includes a volatile storage device such as a DRAM or a SRAM. Secondary storage device 308 includes, for example, a non-volatile storage device such as an HDD or an SSD.

Chipset 304 mediates the exchange of the data between processor 302 and each component, thereby implementing the processing of entire safety unit 300.

Secondary storage device 308 stores, in addition to the system program, a safety program that operates in an operating environment provided by the system program.

Memory card interface 314 is configured such that memory card 315, which is an example of a storage medium, can be inserted therein and removed therefrom. Memory card interface 314 can write data such as the safety program and various settings to memory card 315 or read data such as the safety program and various settings from memory card 315.

Internal bus controller 322 is in charge of data exchange with control unit 100 via the internal bus.

Indicator 324 indicates an operation state, etc. of safety unit 300, and includes one or a plurality of LEDs and the like arranged on a unit surface.

Although FIG. 6 illustrates the configuration example in which necessary functions are provided by processor 302 executing the program, some or all of these provided functions may be implemented using a dedicated hardware circuit (for example, ASIC or FPGA). Alternatively, the main part of safety unit 300 may be implemented using hardware (for example, an industrial personal computer based on a general-purpose personal computer) in accordance with a general-purpose architecture. In this case, a plurality of OSs having different uses may be executed in parallel using a virtualization technology, and necessary applications may be executed on each OS.

E. Control System 10

Figure 7:
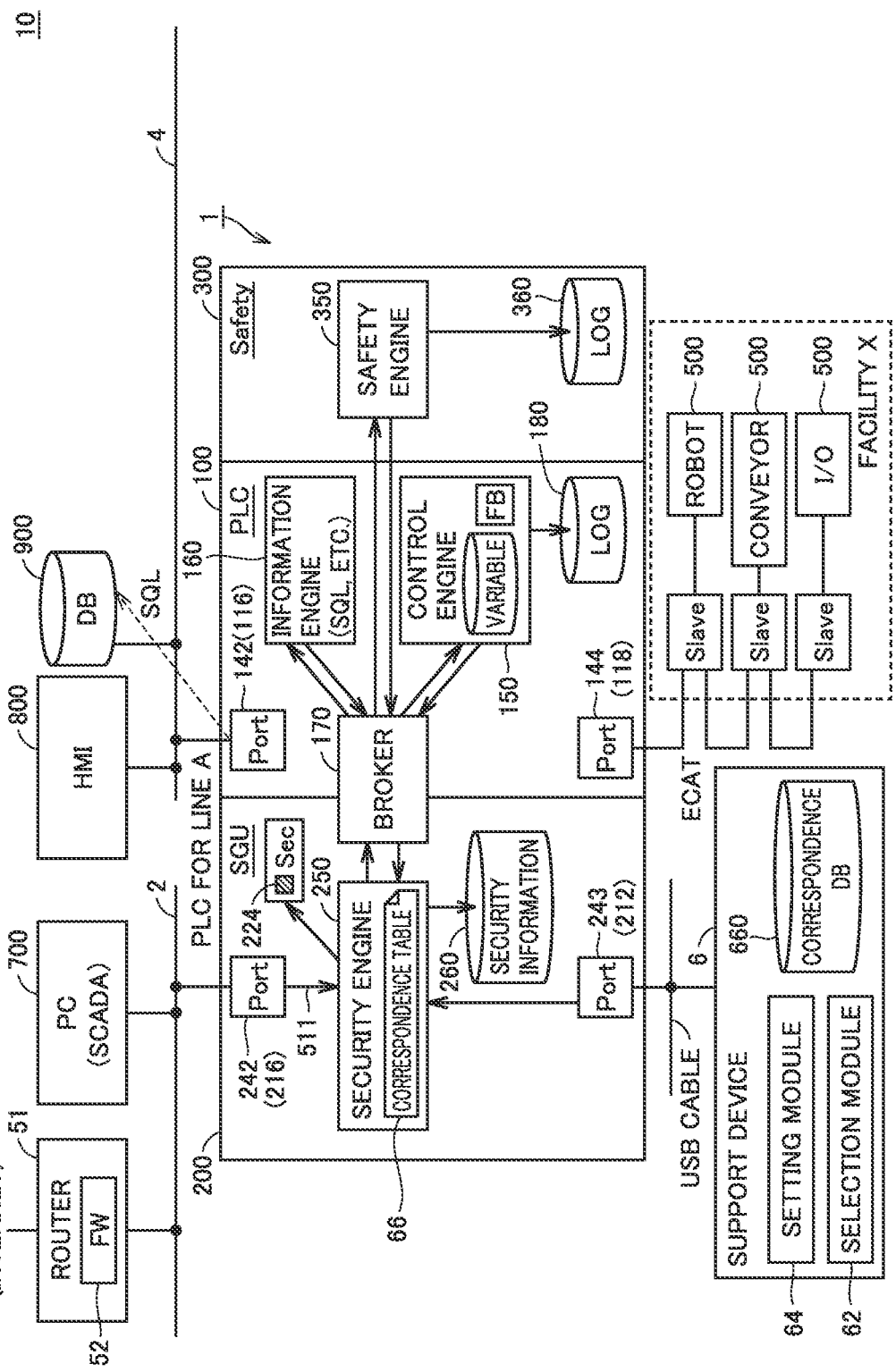
FIG. 7 is a schematic diagram illustrating a typical example of a control system 10 including controller system 1 according to the present embodiment.

A typical example of control system 10 including controller system 1 according to the present embodiment will be described with reference to FIG. 7. FIG. 7 is a schematic diagram illustrating a typical example of control system 10 including controller system 1 according to the present embodiment. For convenience of description, functional unit 400 and power supply unit 450 are not illustrated in FIG. 7.

As an example, control system 10 illustrated in FIG. 7 controls facility X. Facility X is, for example, a facility used in an assembly process, and includes, as field device 500, a conveyor for conveying a workpiece and a robot capable of giving any physical action to the workpiece on the conveyor.

Security unit 200 of controller system 1 is connected to a support device 6 via a communication port 243 (USB controller 212 in FIG. 5). Support device 6 is capable of accessing security unit 200 and control unit 100, and provides a user with functions such as a function of creating a program executed by each unit included in controller system 1, a debug function, and a function of setting various parameters. Support device 6 accesses security unit 200 and control unit 100, and sets the incident response operation executed by controller system 1.

In the present embodiment, support device 6 accesses security unit 200, and installs correspondence table 66 in security unit 200.

Security unit 200 of controller system 1 is connected to a first network 2 via a communication port 242 (network controller 216 in FIG. 5). A supervisory control and data acquisition (SCADA) device 700 is connected to first network 2 via communication port 242.

SCADA device 700 presents various types of information obtained by control computation in controller system 1 to an operator, and generates an internal command or the like for controller system 1 in response to an operation performed by the operator. SCADA device 700 also has a function of collecting data handled by controller system 1.

A router 51 including a processor (not illustrated) such as a CPU is connected to security unit 200 via communication port 242. Router 51 has a function of relaying communication between security unit 200 and an external network 50, a function of a fire wall (FW) 52, and the like.

Control unit 100 of controller system 1 is connected to a second network 4 via a communication port 142 (network controller 116 in FIG. 4). A human machine interface (HMI) 800 and a database 900 can be connected to second network 4.

HMI 800 corresponds to a personal computer. HMI 800 presents various types of information obtained by control computation in controller system 1 to the operator, and generates an internal command or the like for controller system 1 in response to an operation performed by the operator. HMI 800 can be configured so that it can be carried by a maintenance person of FA.

Database 900 collects various kinds of data (for example, information regarding traceability measured from each workpiece, and the like) transmitted from controller system 1.

Control unit 100 of controller system 1 is connected to one or more field devices 500 via a communication port 144 (network controller 118 in FIG. 2). Field device 500 includes a sensor and a detector that are disposed in production facility X and collect various types of information necessary for control computation, an actuator that gives some action to the workpiece, and the like. In the example illustrated in FIG. 7, field device 500 includes a robot that gives some external action to the workpiece, a conveyor that conveys the workpiece, an I/O unit that exchanges a signal with a sensor or an actuator installed in the field, and the like.

Focusing on the functional aspect of controller system 1, control unit 100 includes a control engine 150 serving as a processing execution unit that executes control computation related to standard control, and an information engine 160 that exchanges data with an external device. Security unit 200 includes a security engine 250 for implementing security functions. Safety unit 300 includes a safety engine 350 that is a processing execution unit that executes control computation related to the safety control.

Each engine is implemented by any hardware element such as a processor of each unit, any software element such as various programs, or a combination thereof. Each engine can be implemented in any form.

Controller system 1 further includes a broker 170 that mediates exchange between the engines. The entity of broker 170 may be located in one or both of control unit 100 and security unit 200.

Security engine 250 detects an incident on the basis of a predetermined detection logic, and issues a command to control unit 100 and the like to operate according to correspondence table 66 in order to give a response according to correspondence table 66.

Controller system 1 is not limited to have the configuration in which security engine 250 outputs a command, as long as controller system 1 can perform an operation according to correspondence table 66. For example, correspondence table 66 may be installed in control unit 100, information that can identify the type of the incident may be output from security engine 250 to control unit 100, and control unit 100 may execute processing according to the type of the incident in accordance with correspondence table 66.

Control engine 150 holds a variable table, a function block (FB), and the like necessary for execution of control computation for controlling a control target. Each variable stored in the variable table is periodically collected with the value acquired from field device 500 by I/O refresh processing, and the value of each variable is periodically reflected to field device 500. The log of the control computation in control engine 150 may be stored in a log database 180 of secondary storage device 108.

In addition, control engine 150 executes the incident response operation according to the command given from security engine 250.

Information engine 160 executes any information processing on data (variable values held in the variable table) held by control unit 100. Typically, information engine 160 includes a process of periodically transmitting data held by control unit 100 to database 900 or the like. SQL or the like is used for such transmission of data.

Safety engine 350 detects whether or not any unauthorized intrusion occurs in controller system 1. Safety engine 350 acquires and reflects a safety I/O variable necessary for executing the control computation related to the safety control through control unit 100. The log of the safety control in safety engine 350 may be stored in a log database 360 of secondary storage device 308.

F. Response Upon Occurrence of Incident

FIG. 8 is a diagram illustrating correspondence table 66 defining behavior for each incident. Incidents 1 to 3 in correspondence table 66 illustrated in FIG. 8 are different in incident characteristics. The term "incident characteristic" includes an attribute (for example, an attack type, an attack characteristic, an attack level, severity, urgency, etc.) of a detected unauthorized intrusion (security threat).

Phases A to C in correspondence table 66 illustrated in FIG. 8 are different from each other in the operation state of control unit 100 or the control target controlled by control unit 100. The operation state of control unit 100 includes, for example, a state during normal operation, a state during remote access, a state during debugging, and the like. The operation state of the control target controlled by control unit 100 includes, for example, a state during operation, a state during maintenance, a state during suspension, a state during changeover, and the like. Hereinafter, the operation state of control unit 100 or the operation state of the control target controlled by control unit 100 is also simply referred to as an "operation state".

Response 1, response 2, and response 4 in correspondence table 66 illustrated in FIG. 8 indicate the behavior of controller system 1.

That is, in correspondence table 66 illustrated in FIG. 8, the behavior of controller system 1 is defined according to the incident characteristic and the operation state. Controller system 1 behaves in accordance with correspondence table 66 in response to the characteristics of the incident that has occurred and the operation state when the incident has occurred. Note that correspondence table 66 is not limited to that illustrated in FIG. 8 which classifies the behavior of controller system 1 in two axes.

FIGS. 9 and 10 are diagrams illustrating modifications of the correspondence table. Referring to FIG. 9, a correspondence table 66A defines the behavior of controller system 1 according to the operation state regardless of incident characteristics. Referring to FIG. 10, a correspondence table 66B defines the behavior of controller system 1 according to the incident characteristics regardless of operation state.

In the example illustrated in FIG. 8, the behavior of controller system 1 simply includes response 1, response 2, and response 4. Note that the behavior of controller system 1 can be roughly classified into a response for facility control and a response for information communication. The facility control mainly means a process performed by control engine 150 of control unit 100 and/or safety engine 350 of safety unit 300 (see FIG. 7), and means a response to an operation of a facility or a machine to be controlled. The information communication mainly means a process performed by information engine 160 of control unit 100, and means a response to data exchange between control unit 100 and an external device, handling of information inside control unit 100, etc.

Examples of the behavior (response) of controller system 1 include "normal operation", "fallback", and "stop". The "normal operation" means a state in which facilities and machines can be continuously operated according to a system design and a production plan. The "fallback" means that controller system 1 continues to operate only in a limited way, for example, controller system 1 is partially stopped (only partially operated), is reduced in performance (decreased in performance), or is limited in function. The "stop" means that the operation of the target facility, machine, or controller system 1 is safely stopped.

An example of "fallback" will be described.

(1) Fallback of Facility Control

Fallback of facility control means that an operation is continued in a limited way in terms of range, function, productivity, etc.

Regarding a range, a zone to be controlled can be limited. As the zone to be controlled, a control side such as a control device, a module attached to the control device, and a unit attached to the control device can be limited, for example. Alternatively, a controlled side (controlled object) such as a specific machine, line, floor, or entire factory can be limited.

Regarding a function, a specific process (for example, information control, standard control, safety control, etc.) among the processes provided by controller system 1 can be limited.

Regarding productivity, the productivity (for example, a line speed, the number of products per unit time, a production amount per unit time, etc.) can be temporarily limited for safety and security.

(2) Fallback of Information Communication

The fallback of information communication means that an operation is performed in a limited way in terms of range, direction, band, quality of service (QoS), data, etc.

Regarding a range, communication physical ports, communication logical ports, network disconnection, etc. can be limited, for example.

When communication physical ports are limited, use of a specific port among the communication ports provided in control unit 100 and security unit 200 can be limited. Alternatively, only the communication ports on the host side or the communication ports on the field side from among the communication ports mounted in controller system 1 may be enabled.

When communication logical ports are limited, available TCP/UDP ports may be limited, or available communication protocols may be limited. Further, a MAC address or an IP address for receiving an access may be limited.

Regarding direction, the direction in which data flows in each port may be limited to, for example, only one direction. For example, for a specific port, only reception of data is permitted, or only transmission of data is permitted. By permitting only such unidirectional data, it is possible to prevent data from leaking from controller system 1 when any security threat is detected.

Regarding band, the communication rate may be limited (changed from 1 Gbps to 100 Mbps, for example) in order to reduce the communication load or the processing load of controller system 1.

Regarding QoS, the priority of a packet to be passed may be dynamically changed. For example, when any security threat is detected, the priority of a packet to be passed may be changed to be high.

Regarding data, in an industrial network protocol such as EtherCAT, switching between validity and invalidity of process data communication and update of an output value may be limited (for example, the update of the output value is stopped, the output value is cleared to zero, or the previous value is held), for example.

The "fallback" is not limited to the above, and may include an operation in a state in which any limitation is imposed on the normal operation. Note that "fallback" can also be regarded as partial stop, and "stop" can also be regarded as a concept obtained by extending "fallback" because "stop" can include complete stop of a specific function.

G. Response Rule According to Facility Type

Correspondence table 66 defining the behavior for each incident is preferably determined according to the facility type. For example, in a case where an object to be controlled by control unit 100 is a filling machine, and this filling machine is brought to an emergency stop while being normally operated, a problem remains from the viewpoint of safety. On the other hand, in a case where an object to be controlled by control unit 100 is an assembling machine or a conveyance device, and this assembling machine or conveyance device is brought to an emergency stop while being normally operated, it is considered that there is no safety problem.

In addition, some facilities may require a lot of time to recover again after being temporarily stopped. In such a case, economic damage caused by stopping the facility is significant, and it is expected that it is better to perform fallback.

In some facilities, a person performs a task in cooperation with a machine. Whether or not it is necessary to consider safety for a person is different between a case where a person is working in the facility as described above and a case where no person is working in the facility.

As described above, it is preferable to set a response according to an incident depending on a viewpoint of safety required for facility, a viewpoint of importance of the facility in a factory, a viewpoint of economic damage caused by stopping the facility, and the like.

H. Setting of Incident Response (h1. Flow of Setting)

Figure 11:
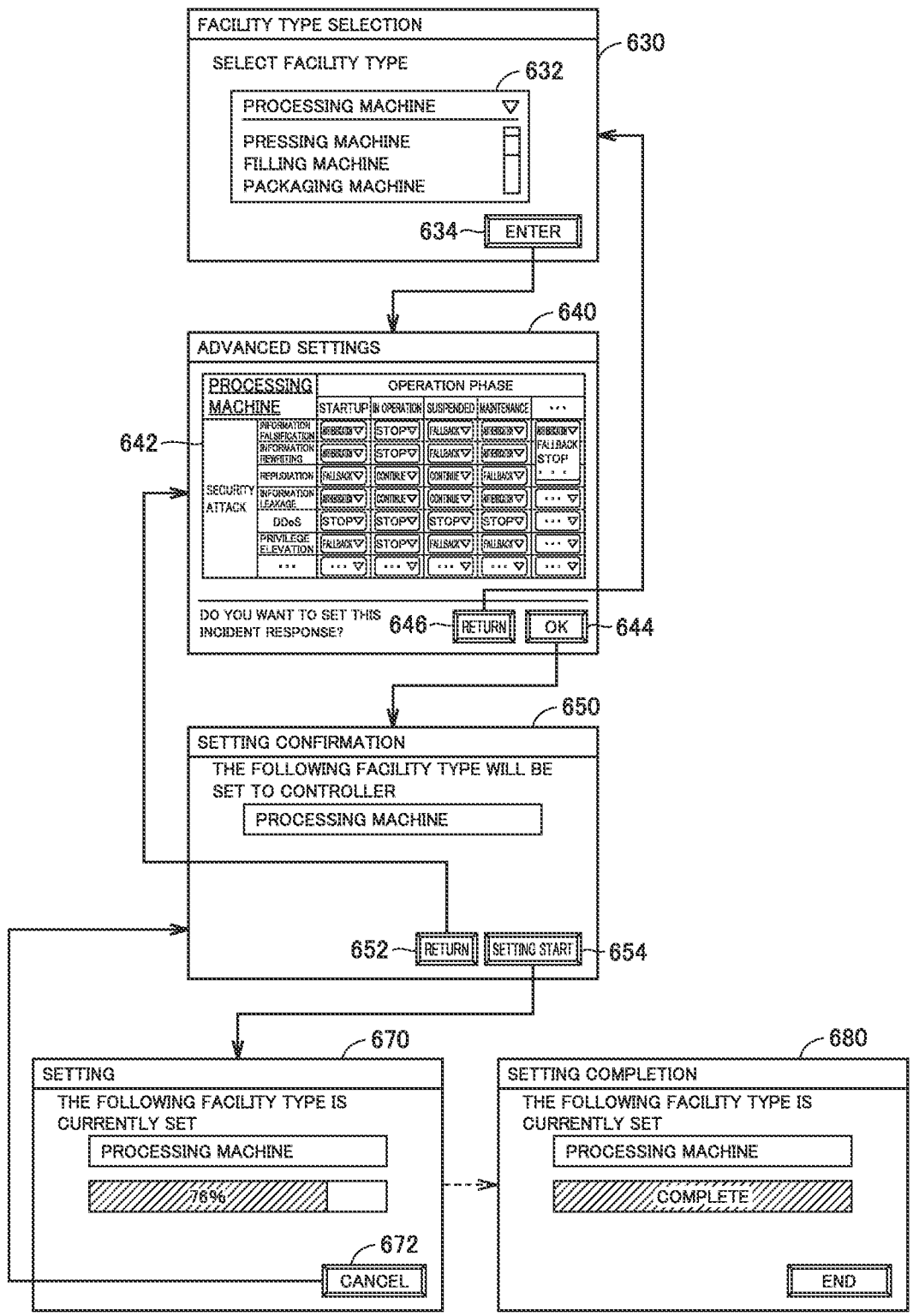
FIG. 11 is a diagram illustrating transition of a user interface screen.

A flow of setting a response for each incident using support device 6 will be described with reference to FIG. 11. FIG. 11 is a diagram illustrating the transition of the user interface screen. Each user interface screen shown in FIG. 11 is displayed on display unit 608 of support device 6, for example. Upon setting a response to an incident, first, facility type selection screen 630 for receiving selection of a facility type is displayed on display unit 608.

Facility type selection screen 630 has a selection area 632 for selecting a facility type and an enter button 634 for determining the selected facility type. When enter button 634 is operated in a state where one of multiple facility types in selection area 632 is selected, the display of display unit 608 is switched from facility type selection screen 630 to advanced settings screen 640.

Advanced settings screen 640 is a screen for setting a response to an incident. In the present embodiment, a range that can be set as the incident response operation is preset for each facility type. The user can set the incident response operation within a preset range. Advanced settings screen 640 is provided with a selection area 642 for selecting the incident response operation, an enter button 644 for determining the selected incident response operation, and a return button 646 for returning to the previous screen.

That is, in the present embodiment, support device 6 can receive a change in the correspondence table, and a changeable range is preset for each facility type.

When enter button 644 is operated, a confirmation screen 650 for starting a process for reflecting the response rule defined in selection area 642 in controller system 1 is displayed.

When a return button 652 provided in confirmation screen 650 is operated, advanced settings screen 640 is displayed again, and the incident response operation can be selected again.

When a setting start button 654 provided in confirmation screen 650 is operated, a process for reflecting the incident response operation selected in advanced settings screen 640 in controller system 1 is started, and a setting screen 670 is displayed. Then, after the reflection is completed, a completion screen 680 is displayed. When a cancel button 672 is operated while setting screen 670 is displayed, the process for reflecting the incident response operation in controller system 1 is interrupted, and the screen returns to confirmation screen 650.

(h2. Facility Type Selection Screen 630)

Figure 12:
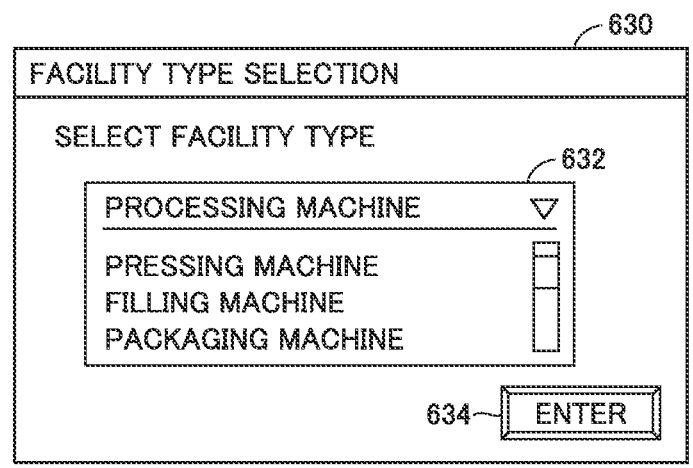
FIG. 12 is a diagram illustrating an example of a facility type selection screen 630.

FIG. 12 is a diagram illustrating an example of facility type selection screen 630. In the present embodiment, the facility types are classified according to a control purpose of the control target. Specific examples of the control purpose include assembly, filling, packaging, stirring, and conveyance. In addition, the name of the control target is often assigned according to the control purpose, and thus, the classification by the control purpose can also be considered as classification by the name of the control target. In the example illustrated in FIG. 12, the user selects the facility type by selecting the name (pressing machine, filling machine, packaging machine, etc.) of the control target.

Since the facility types are classified according to the control purpose of the control target as described above, the user can easily select the facility type.

(h3. Advanced Settings Screen 640)

Figure 13:
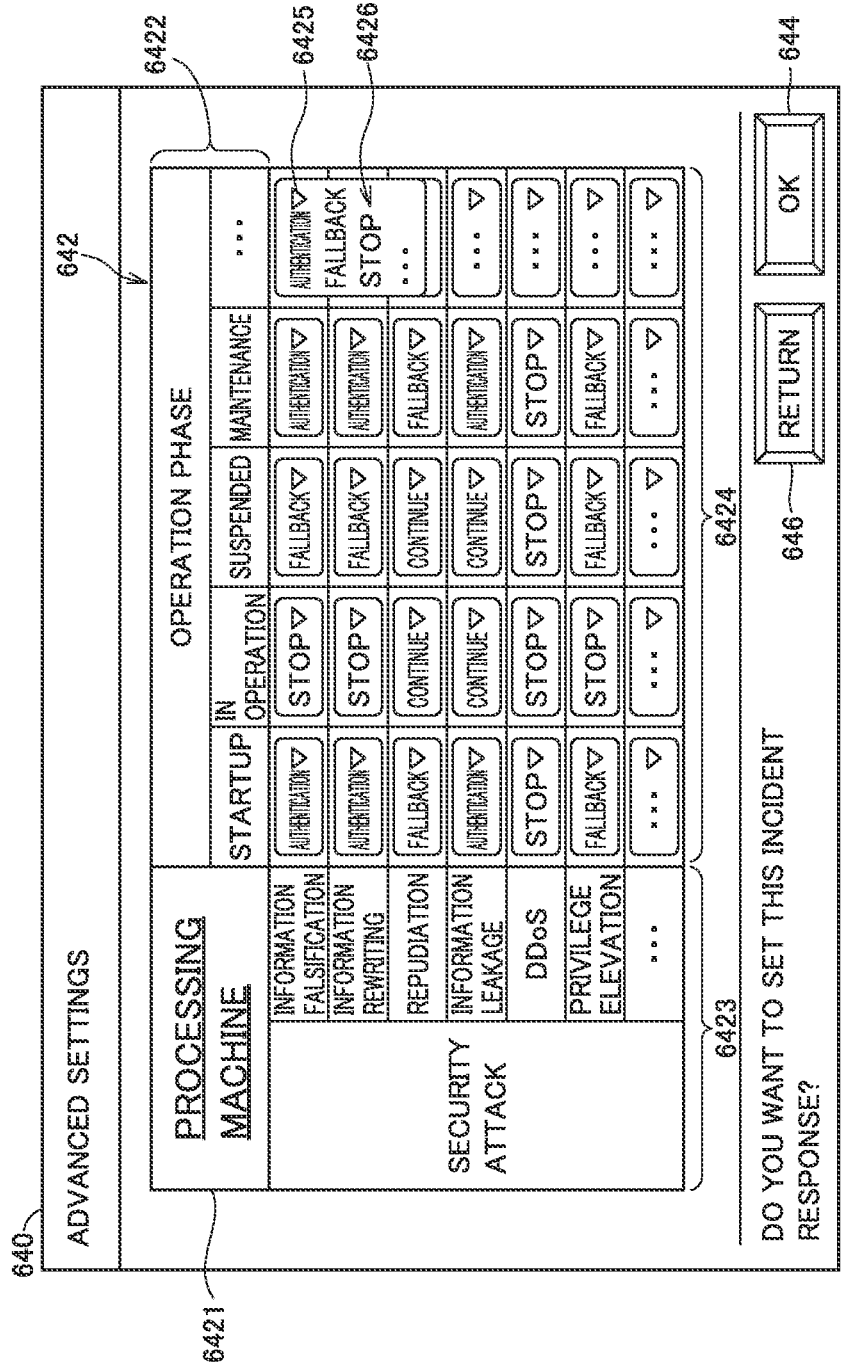
FIG. 13 is a diagram illustrating an example of an advanced settings screen 640 for a processing machine.
Figure 14:
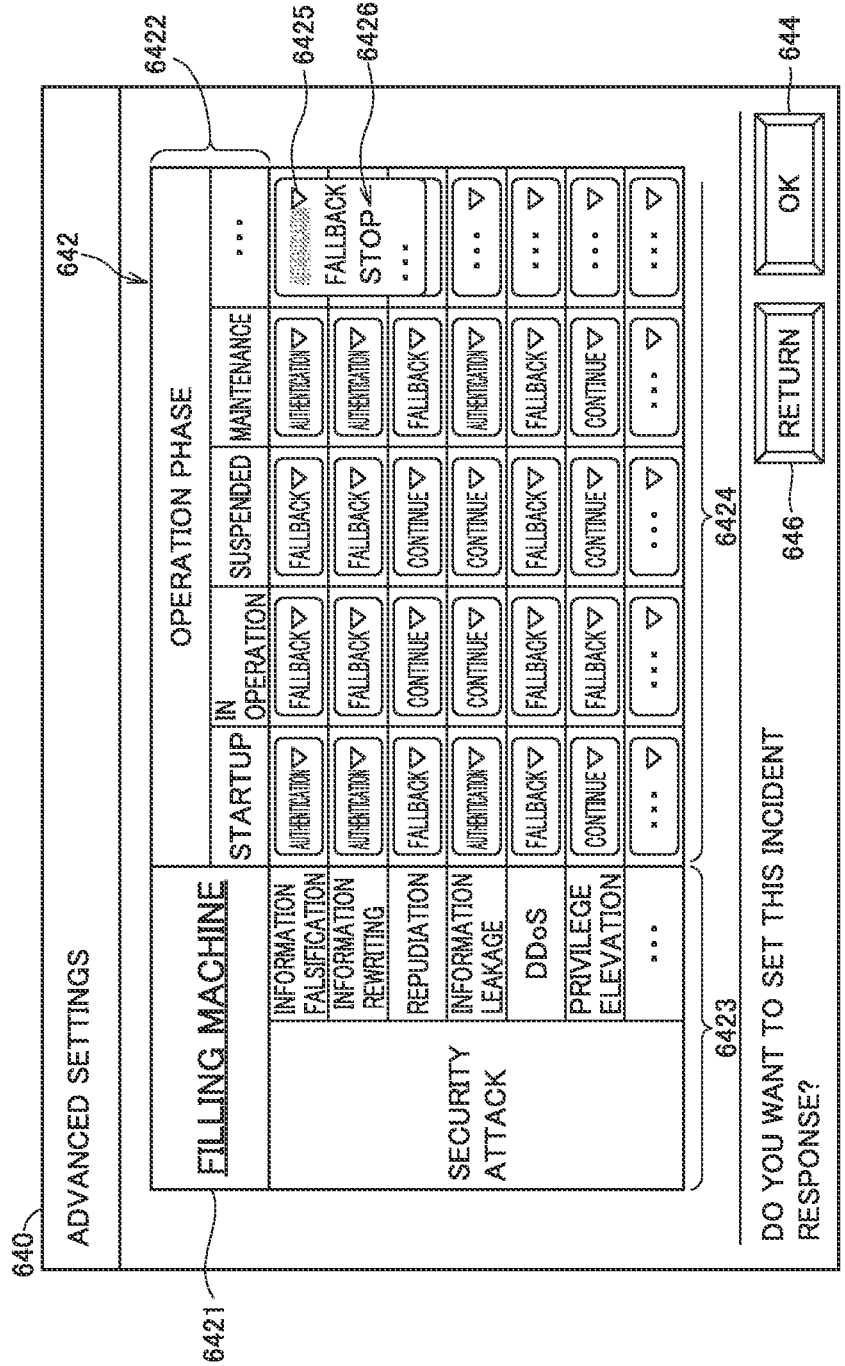
FIG. 14 is a diagram illustrating an example of advanced settings screen 640 for a filling machine.

Advanced settings screen 640 for each facility type will be described with reference to FIGS. 13 and 14. FIG. 13 is a diagram illustrating an example of advanced settings screen 640 for the processing machine. FIG. 14 is a diagram illustrating an example of advanced settings screen 640 for the filling machine.

Referring to FIGS. 13 and 14, selection area 642 of advanced settings screen 640 includes a type display area 6421, an operation type area 6422, an incident type area 6423, and a setting area 6424.

In type display area 6421, the facility type selected in facility type selection screen 630 is displayed. In operation type area 6422, an operation state is displayed. In the examples illustrated in FIGS. 13 and 14, the operation state of the control target is displayed. The operation state may be the operation state of controller system 1.

Incidents are displayed in incident type area 6423. In setting area 6424, a behavior when an incident occurs is displayed for each operation state.

The operation state and the behavior for each incident displayed in setting area 6424 are selectable. Specifically, when a tab 6425 is operated, a plurality of types of behaviors are displayed as a pull-down list 6426, and the user can select one of the behaviors.

Referring to FIGS. 13 and 14, a default value displayed in setting area 6424 is preset for each facility type. For example, the default value of the behavior when information falsification occurs during the operation of the processing machine is "stop", whereas the default value of the behavior when information falsification occurs during the operation of the filling machine is "fallback".

As described above, since the default value is preset for each facility type with the behavior for each incident being selectable, it is possible to perform setting according to the site, and even a user (developer) having insufficient knowledge can easily perform setting.

With reference to FIGS. 13 and 14, the behavior selectable as the behavior for each operation state and each incident is preset for each facility type. For example, the behavior types selectable in pull-down list 6426 for the processing machine are "authentication", "fallback", "stop", and the like, whereas the behavior types selectable in pull-down list 6426 for the filling machine are "fallback", "stop", and the like, and "authentication" cannot be selected.

As described above, since the behavior selectable as the behavior for each operation state and each incident is preset for each facility type, it is possible to ensure the minimum protection.

The list of selectable behaviors is preset for each operation state and incident according to the facility type.

The behavior may be unchangeable depending on the facility type, the operation state, and the incident. For example, depending on the incident that has occurred, there may be a case where it is necessary to immediately disconnect the network for protection of the information asset, or a case where it is necessary to immediately stop operation for ensuring safety of the user. As described above, by disabling selection of the behavior depending on the facility type, the operation state, and the incident, it is possible to, for example, reliably protect the information asset and secure safety.

As described above, support device 6 can prepare the incident response in advance for each facility type and reflect the incident response corresponding to the selected facility type in controller system 1. Therefore, it is possible to easily set the response rule according to the facility type. In particular, in a case where a developer with insufficient knowledge performs setting, it is possible to prevent in advance occurrence of a serious fault such as leakage of information assets and deterioration of safety of facility.

I. Modification of Facility Type

In the above embodiment, the facility types are classified according to control purposes. Note that the facility types may be classified according to a demand for the control target. That is, the facility types are not classified by the name of the control target (facility), but may be classified from another viewpoint.

The demand for the control target varies depending on the control purpose of the control target, the position where the control target is installed, the method of using the control target, the position of the control target in the entire facility, and the like. When the demand for the control target varies, the priority order at the time of incident response also changes, so that it is preferable to change the incident response.

FIG. 15 is a diagram illustrating a correspondence table for each facility type in the modification. Note that attacks 1 to 3 in FIG. 15 are incidents. Phases A to C are operation states. In addition, "all responses selectable" means that all the responses of a plurality of incident responses can be selected. "Responses 2 and 3 unselectable" means that response 2 and response 3 cannot be selected from among a plurality of incident responses. The same applies to "Responses 1, 2, 3 unselectable", "Response 2 unselectable", and "Response 3 unselectable".

Referring to FIG. 15, the facility types are classified not by the name of the control target (facility) but by other viewpoints such as class 1, class 2, and class 3 . . . .

It is possible to easily set the incident response depending on the demand for the control target by classifying the facility types according to the demand for the control target and preparing the correspondence table for each facility type.

FIG. 16 is facility type selection screen 630A according to a first modification. Referring to FIG. 16, the user answers the questions indicated in an YES/NO chart, and selects the class the user has arrived as a result of answering the questions. Thus, the user can select the facility type. For example, when the facility type is selected (clicked), an advanced settings screen corresponding to the selected facility type is displayed. Note that each question illustrated in FIG. 16 is a demand for the control target.

Referring to FIG. 16, the demand for the control target includes, for example, a demand regarding the security characteristic. For example, the candidates for the facility type are narrowed down depending on whether or not there is a task related to human safety. Specifically, when there is no task related to human safety, class 1 is excluded from the candidates for the facility type. On the other hand, in a case where there is a task related to human safety, class 3 is excluded from the candidates.

Referring to FIG. 16, the demand for the control target includes a demand regarding the importance of evidence information in the facility. For example, the candidates for the facility type are narrowed down depending on whether or not it is necessary to definitely leave evidence information. If it is necessary to definitely leave evidence information, class 3 is excluded from the candidates. On the other hand, when it is not necessary to definitely leave the evidence information, class 2, class 4, and other classes are excluded from the candidates. The importance of the evidence information in the facility varies depending on, for example, whether the control target to be set functions as an auxiliary machine or functions as a master machine in the production site or in one process.

Referring to FIG. 16, the demand for the control target includes a demand derived from a relationship with another facility. For example, the candidates of the facility type are narrowed down depending on whether or not other processes are affected by its stop and whether or not other processes are affected by its fallback. Specifically, in a case where other processes are affected by its stop, class 4 is excluded from the candidates. On the other hand, in a case where other processes are not affected by its stop, class 1 is excluded from the candidates. In addition, in a case where other processes are affected by its fallback, class 4 is excluded from the candidates. On the other hand, in a case where other processes are not affected by its fallback, class 2 and other classes are excluded from the candidates.

Referring to FIG. 16, the demand for the control target includes a demand from the viewpoint of asset protection. For example, the candidates for the facility type are narrowed down depending on whether or not waste generation occurs due to its stop and whether or not a load is applied to the machine due to its emergency stop. Specifically, in a case where waste generation occurs due to its stop, class 2 and other classes are excluded from the candidates. On the other hand, in a case where waste generation does not occur due to its stop, class 1 is excluded from the candidates. In addition, in a case where a load is applied to the machine due to its emergency stop, other classes are excluded from the candidates. On the other hand, in a case where a load is not applied to the machine due to its emergency stop, class 2 is excluded from the candidates.

In this manner, the facility types may be classified according to a demand for the facility. In this case, as illustrated in FIG. 16, it is preferable to provide a user interface screen on which the facility type can be easily selected.

The method for selecting the facility type is not limited to the method illustrated in FIG. 16. FIG. 17 is facility type selection screen 630B according to a second modification. FIG. 18 is a diagram illustrating an example of facility type determination table 636B for determining a facility type in accordance with information input using facility type selection screen 630B illustrated in FIG. 17.

Referring to FIG. 17, the user inputs an answer to each displayed question by operating a "YES" or "NO" button. When the contents of the answers are determined after the user answers all the displayed questions, the facility type is selected according to facility type determination table 636B illustrated in FIG. 18 and the contents of the answers. When the facility type is selected, an advanced settings screen corresponding to the selected facility type is displayed.

Each question illustrated in FIG. 17 indicates a demand for the control target. The user selects "YES" or "NO" to select whether or not there is a demand indicated by the question for the control target to be set.

That is, as illustrated in FIG. 17, support device 6 may receive the selection of the demand for the control target to be set from the plurality of demands for the control target, and determine the facility type on the basis of the received demand. Furthermore, the YES/NO chart illustrated in FIG. 16 may be provided in a form of a wizard in which questions are displayed one at a time.

Figure 19:
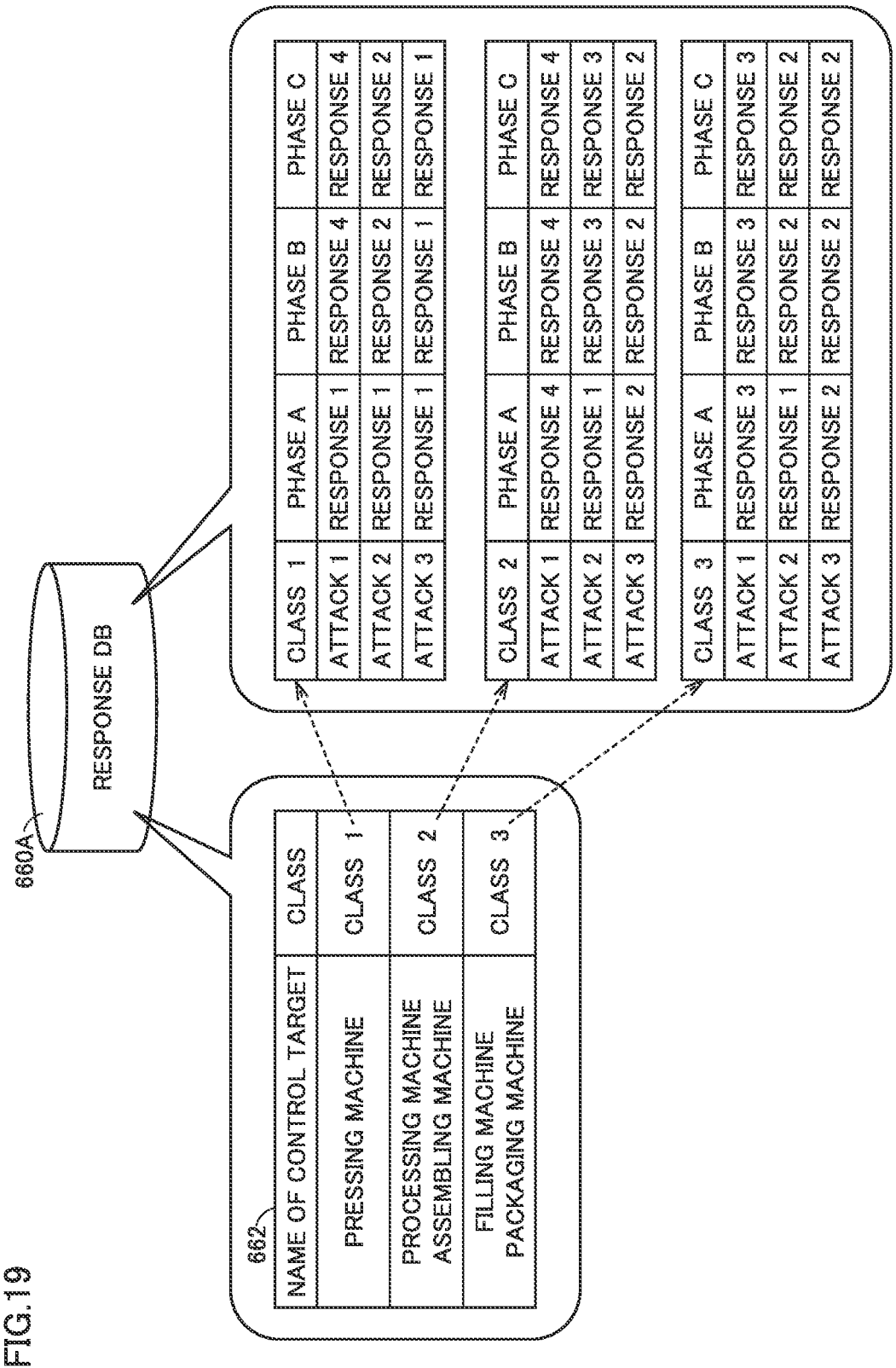
FIG. 19 is a diagram illustrating a correspondence database 660A according to a modification.

Further, support device 6 may store the selected facility type (class) and facility name in association with each other in the correspondence database. FIG. 19 is a diagram illustrating correspondence database 660A according to a modification. Referring to FIG. 19, correspondence database 660A stores correspondence table 66 and a facility type correspondence table 662 in which the name (application name) of the facility is associated with the facility type (class).

Note that the facility type (class) and the facility name may be associated in advance or the user may associate them with each other. For example, after the facility type is specified by the method illustrated in FIG. 16 or 17, the input of the name of the target facility may be received, and the facility type and the facility name may be associated with each other. In this manner, by associating the facility type classified depending on the demand for the control target with the name (purpose) of the facility, it is possible to select the facility type according to the control purpose and select the facility type according to the demand for the control target.

In addition, in a case where the selection of the name of the facility is received, but the facility type corresponding to the name of the facility is not registered, the selection of the facility type may be received by the method illustrated in FIG. 16 or 17.

In addition, when a program related to a new facility is installed in support device 6, a facility type corresponding to the facility or an incident response table for the facility may be installed together.

J. Method for Creating Correspondence Table

Correspondence table 66 is designed on the basis of, for example, a result of threat analysis performed on the basis of information regarding facility and/or a security policy of a company that operates the facility.

Furthermore, as illustrated in FIGS. 9 and 10, the incident response does not need to be set on the basis of both the operation state and the incident, and may be set depending on at least the facility type.

K. Other Modifications

In the above embodiment, in controller system 1, the detection of the incident and the processing corresponding to the detected incident are executed by different units (security unit 200 and control unit 100). Note that the detection of the incident and the processing corresponding to the detected incident may be executed by a common unit.

In the above embodiment, one facility is controlled by one controller system. Note that one controller system may control a plurality of facilities. For example, a plurality of control units may be connected to one security unit, and one facility may be controlled by each control unit. In such a case, the security unit may have correspondence tables for the respective control units and instruct each control unit to execute processing according to the corresponding one of the correspondence tables in response to the occurrence of an incident.

In this case, a correspondence table corresponding to each control unit may be stored. The security unit notifies each control unit of occurrence of the incident and/or information that can identify a type of the incident that has occurred, and the control unit may perform processing according to the notified incident and the stored correspondence table.

L. Appendix

The present embodiment and modifications described above include the following technical ideas.

[Configuration 1]

A support device (6) that is connected to a controller system (1) configured to control a control target (500), the controller system being configured to be capable of executing an incident response operation of changing a behavior in accordance with an incident that may occur in the controller system, the support device comprising:
- a selection module (62, 630, 630A, 630B) configured to receive selection of a facility type corresponding to the control target among a plurality of facility types which is preset; and
- a setting module (64, 650) configured to reflect a response rule corresponding to the selected facility type in the controller system by referring to a response rule (66, 66A, 66B, 660, 660A) that is prepared in advance for each of the facility types and defines a behavior for an incident.

[Configuration 2]

The support device according to configuration 1, in which the facility types are classified according to a control purpose of the control target (632).

[Configuration 3]

The support device according to configuration 1, in which the facility types are classified according to a demand for the control target (630A, 630B).

[Configuration 4]

The support device according to configuration 3, in which the selection module receives an input of a control purpose of the control target, and stores the received control purpose and the selected facility type in association with each other.

[Configuration 5]

The support device according to any one of configurations 1 to 4, in which the setting module receives a change in the response rule (6424), and the response rule has a default value that is preset for each of the facility types.

[Configuration 6]

The support device according to configuration 5, in which a range in which the response rule is changeable is preset for each of the facility types (6426).

[Configuration 7]

A recording medium storing a setting program (6104) for setting a behavior of a control system (1) for controlling a control target (500), the controller system being configured to be capable of executing an incident response operation of changing a behavior in accordance with an incident that may occur in the controller system, the setting program causing a computer (6) to execute:
- receiving selection of a facility type corresponding to the control target among a plurality of facility types which is preset (62, 630, 630A, 630B); and
- reflecting a response rule corresponding to the selected facility type in the controller system by referring to a response rule (66, 66A, 66B, 660, 660A) that is prepared in advance for each of the facility types and defines a behavior for each incident (64, 650).

It should be understood that the embodiments disclosed herein are illustrative in all respects and not restrictive. The scope of the present invention is defined not by the above description but by the claims, and is intended to include meanings equivalent to the claims and all modifications within the scope.

REFERENCE SIGNS LIST

1: Controller system, 2: First network, 4: Second network, 6: Support device, 10: Control system, 50: External network, 51: Router, 62: Selection module, 64: Setting Module, 66, 66A, 66B: Correspondence table, 100: Control unit, 102, 202, 302, 602: Processor, 104, 204, 304: Chipset, 106, 206, 306: Main storage device, 108, 208, 308: Secondary storage device, 110, 210: Communication controller, 112, 212, 620: USB controller, 114, 214, 314: Memory card interface, 115, 215, 315: Memory card, 116, 118, 120, 216, 218: Network controller, 122, 322: Internal bus controller, 124, 224, 324: Indicator, 142, 144, 242, 243: Communication port, 150: Control engine, 160: Information Engine, 170: Broker, 180, 360: Log database, 200: Security unit, 250: Security Engine, 300: Safety unit, 350: Safety engine, 400: Functional unit, 450: Power supply unit, 500: Field device, 604: Main memory, 606: Input unit, 608: Display unit, 610: Storage, 612: Optical drive, 614: Recording medium, 618: Processor bus, 630, 630A, 630B: Facility type selection screen, 632, 642: Selection area, 634, 644: Enter button, 636B: Facility type determination table, 640: Advanced settings screen, 646, 652: Return button, 650: Confirmation screen, 654: Setting start button, 660, 660A: Correspondence database, 662: Facility type correspondence table, 670: Setting screen, 672: Cancel button, 680: Completion screen, 700: SCADA device, 800: HMI, 900: Database, 6104: Support program, 6421: Type display area, 6422: Operation type area, 6423: Incident type area, 6424: Setting area, 6425: Tab, 6426: Pull-down list

The invention claimed is:

1. A support device that is connected to a controller system configured to control a control target, the controller system being configured to be capable of executing an incident response operation of changing a behavior in accordance with an incident that may occur in the controller system, the support device comprising a memory storing a program and a processor configured to execute the program, wherein the program, when executed, causes the processor to at least:
   - receive selection of a facility type corresponding to the control target among a plurality of facility types which are preset; and
   - set a response rule corresponding to the selected facility type in the controller system based on a response rule that is prepared in advance for each of the facility types and defines a behavior for an incident,
   - wherein the facility types are classified according to a control purpose of the control target or a demand for the control target.

2. The support device according to claim 1, wherein the program causes the processor to receive an input of a control purpose of the control target, and store the received control purpose and the selected facility type in association with each other.

3. The support device according to claim 1, wherein the program causes the processor to receive a change in the response rule, and
   the response rule has a default value that is preset for each of the facility types.

4. The support device according to claim 3, wherein types of the response rule are different depending on the facility type.

5. A non-transitory recording medium storing a setting program for setting a behavior of a control system for controlling a control target, the controller system being configured to be capable of executing an incident response operation of changing a behavior in accordance with an incident that may occur in the controller system, the setting program causing a computer to execute:

receiving selection of a facility type corresponding to the control target among a plurality of facility types which are preset; and setting a response rule corresponding to the selected facility type in the controller system based on a response rule that is prepared in advance for each of the facility types and defines a behavior for each incident, wherein the facility types are classified according to a control purpose of the control target or a demand for the control target.

6. The non-transitory recording medium according to claim 5, wherein the setting program causes the computer to execute receiving an input of a control purpose of the control target, and storing the received control purpose and the selected facility type in association with each other.

7. The non-transitory recording medium according to claim 5, wherein the setting program causes the computer to execute receiving a change in the response rule, and the response rule has a default value that is preset for each of the facility types.

8. The non-transitory recording medium according to claim 5, wherein types of the response rule are different depending on the facility type.

9. A method for setting a behavior of a control system for controlling a control target, the controller system being configured to be capable of executing an incident response operation of changing a behavior in accordance with an incident that may occur in the controller system, the method comprising:

receiving selection of a facility type corresponding to the control target among a plurality of facility types which are preset; and setting a response rule corresponding to the selected facility type in the controller system by based on a response rule that is prepared in advance for each of the facility types and defines a behavior for each incident, wherein the facility types are classified according to a control purpose of the control target or a demand for the control target.

10. The method according to claim 9, wherein the receiving includes receiving an input of a control purpose of the control target, and storing the received control purpose and the selected facility type in association with each other.

11. The method according to claim 9, further comprising receiving a change in the response rule, wherein the response rule has a default value that is preset for each of the facility types.

12. The method according to claim 9, wherein types of the response rule are different depending on the facility type.

* * * * *